(12) United States Patent
Masifilo

(10) Patent No.: US 10,687,653 B2
(45) Date of Patent: Jun. 23, 2020

(54) KAVA BEVERAGE BREWING APPARATUS

(71) Applicant: Matthew Masifilo, Tampa, FL (US)

(72) Inventor: Matthew Masifilo, Tampa, FL (US)

(*) Notice: Subject to any disclaimer, the term of this patent is extended or adjusted under 35 U.S.C. 154(b) by 348 days.

(21) Appl. No.: 15/803,751

(22) Filed: Nov. 4, 2017

(65) Prior Publication Data
US 2018/0070759 A1 Mar. 15, 2018

Related U.S. Application Data

(62) Division of application No. 14/991,979, filed on Jan. 10, 2016.

(60) Provisional application No. 62/150,664, filed on Apr. 21, 2015.

(51) Int. Cl.
*A47J 31/00* (2006.01)
*A47J 31/20* (2006.01)
*A47J 31/18* (2006.01)
*A47J 31/06* (2006.01)
*A47G 19/16* (2006.01)

(52) U.S. Cl.
CPC ............. *A47J 31/20* (2013.01); *A47J 31/18* (2013.01); *A47G 19/16* (2013.01); *A47J 31/06* (2013.01)

(58) Field of Classification Search
CPC . A47J 31/18; A47J 31/20; A47J 31/06; A47G 19/16; B65D 11/10; B65D 11/105

USPC .......... 99/323, 318, 295, 322, 317; 220/4.25
See application file for complete search history.

(56) References Cited

U.S. PATENT DOCUMENTS

| 1,040,179 | A | * | 10/1912 | Evans | A47J 31/02 99/323 |
| 1,601,671 | A | * | 9/1926 | Bonell | A47G 19/16 99/323 |
| 4,345,512 | A | * | 8/1982 | Moore | A47J 36/027 206/0.5 |
| 6,174,577 | B1 | * | 1/2001 | Vitorino | D06F 58/203 428/36.5 |
| 8,561,524 | B2 | * | 10/2013 | DeMiglio | A47J 31/0689 99/300 |
| 2007/0084355 | A1 | * | 4/2007 | Shen | A47J 31/18 99/495 |
| 2007/0101870 | A1 | * | 5/2007 | Liu | A47J 31/18 99/495 |

* cited by examiner

*Primary Examiner* — Reginald Alexander
(74) *Attorney, Agent, or Firm* — Justin Luby

(57) ABSTRACT

An apparatus for brewing kava beverage. Using the apparatus, kava beverage is brewed by filling a hollow two-piece spherical structure with extremely fine mesh screens with kava. The filled apparatus is placed in a shaker bottle filled with liquid and is shaken vigorously, extracting the kavalactones from the root into the liquid, creating the kava beverage. This using this apparatus for brewing kava beverage is quicker and simpler than traditional methods of brewing kava beverage.

3 Claims, 4 Drawing Sheets

KAVA BEVERAGE BREWING APPARATUS

CROSS-REFERENCE TO RELATED APPLICATIONS

This application is a divisional of Application No. 2016/0309944, filed 10 Jan. 2016.

BACKGROUND

The present invention relates to a beverage made from the roots of the Kava plant (Piper methysticum), often referred to as Kava.

Kava originated in the Pacific Ocean cultures of Polynesia. Kava is sedating and is primarily consumed to relax without disrupting mental clarity. It is commonly used by people to treat insomnia and social anxiety.

The traditional method for brewing kava involves taking kava root (powdered, pressed, ground or shredded) and placing it into fine bags constructed of muslin, cheese cloths, and fine nylon. These material are used for the bags because they have fine pores that entrain the kava root inside them. Traditional tea balls and tea bags are not sufficient because the kava root is finer than tea leaves used for brewing tea and will infiltrate into the kava beverage.

The filled bags are placed in the beverage medium of choice and allowed to seep for several minutes minimum. The beverage medium must be cool or lukewarm. Hot beverage must not be used because the high temperature destroys kava root's main active ingredients known as kavalactones.

Once you let your filled bags seep in the beverage medium, the bags are removed and kneaded or squeezed to remove all of the liquid from the bag typically into a large bowl. The kavalactones are not water soluble, so they need to be compressed in order to be extracted from the root. The kneading/squeezing process will extract the kavalactones from the root into the liquid. The liquid collected in the bowl is the kava that will be consumed, and the bag and residual kava root is disposed of.

This method of brewing has numerous drawbacks. The first drawback of the brewing method is that the process is inefficient. In order to create a kava, the brewer will need prepare the tea in an intermediary larger bowl, and then transfer the extracted tea from the bowl into a cup where it will be ultimately consumed. Removal of the need for the intermediary bowl from the process would make for a more efficient brewing process.

Another drawback of the brewing method is that the process is messy. During the kneading or squeezing procedure, either the hands of the brewer will get coated in the tea, likely requiring the brewer to wash their hands after brewing, or the brewer will need to wear gloving that will be disposed of after brewing the tea. Creating a brewing process that would remove the need for the brewer to wring or squeeze the tea from the bags would be a cleaner process.

A final drawback for this brewing method is that it is not conducive to restaurant sales. Regardless of the cleanliness of the beverage prepares, there will always be a segment of the population who will be turned off from buying a beverage prepared by a food service employee who wrings their beverage out of a bag using their bare hands or even gloved hands. Creating a brewing process that would remove the need for the brewer to wring or squeeze the tea from the bags would likely make the prepared kava more conducive to restaurant sales.

SUMMARY

The aim of the present invention is to provide a kava brewing method that removes the need for an intermediary bowl and is thereby more efficient than the traditional method for brewing kava.

Another aim of the invention is to provide a kava brewing method that removes the need to knead/squeeze the kava extract from the bags, thereby making a brewing method that is cleaner than the traditional method for brewing kava.

Another aim of the invention is to provide a kava brewing method that removes the need to knead/squeeze the kava extract from the bags thereby making a brewing method that is more conducive to restaurant and home brewing than the traditional method for brewing kava.

Another aim of the invention is to provide an apparatus that allows kava to be brewed in a beverage shaker eliminating the need for an intermediate bowl when brewing kava.

Another aim of the invention is to provide an apparatus that allows kava to be brewed in a strainer ball that does not require the liquid to be kneaded or squeezed out of the straining apparatus in order to extract the kavalactones from the root into the liquid.

The kava brewing method of the current invention involves measuring and placing a quantity of kava root into a straining ball apparatus. The filled straining ball apparatus is then placed into a beverage shaker with a quantity of the beverage medium.

Once the shaker has been filled with the beverage medium and the straining ball apparatus, the shaker is agitated by shaking the shaker. When the beverage medium flows through the straining ball apparatus, the kava roots will repeatedly crash into the strainer, creating a similar effect that the kneading and squeezing has in the traditional brewing method, extracting the kavalactones from the kava root into the beverage medium creating a kava.

The strainer apparatus of the current invention involves a two hollow hemi-spheres that form a singular sphere via a threaded connection. Each semi-sphere has a plurality of perforations that are covered by a fine mesh filter. The perforations allow water to pass through the strainer ball, and the mesh filter contains the kava materials inside of the strainer apparatus when in use.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

For a better understanding of the particular embodiments of the present invention reference may be made to the following drawings exemplary of the invention, in which.

DETAILED DESCRIPTION OF THE INVENTION AND PREFERRED EMBODIMENT

Figure 1:
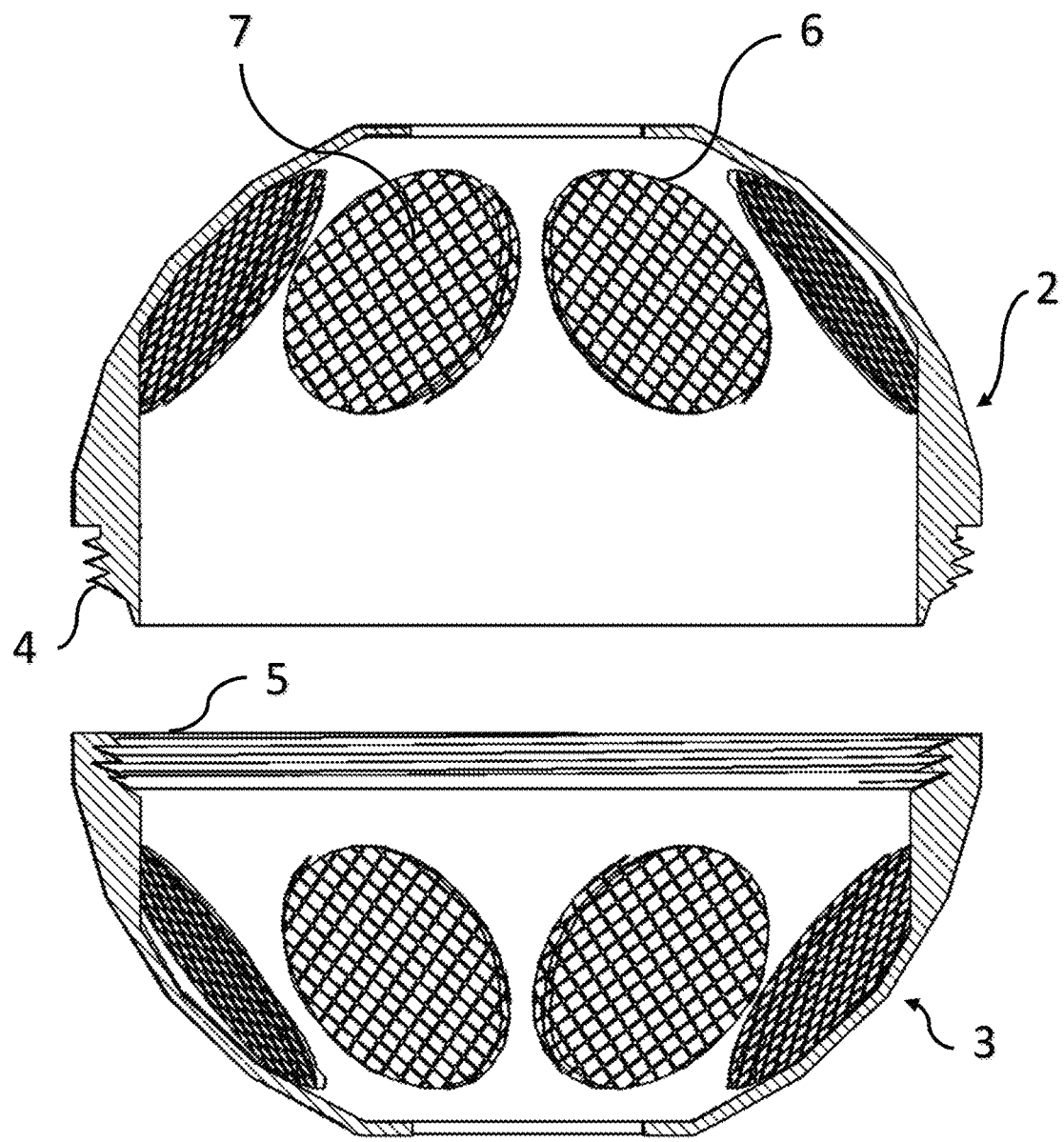
FIG. 1 is a detailed cross sectional drawing of the strainer ball apparatus of the present invention.

Referring to FIG. 1, the preferred embodiment for a strainer apparatus 1 according to the present invention includes two mating hemi-spheres 2, 3. One hemisphere 2 has a male threaded connector 4 that protrudes outwardly from the open half of the hemisphere and the other has a mating female threaded connector 5 that recedes inwardly from the open half of the hemisphere 3.

Referring to FIG. 1, each hemisphere 2, 3 has a plurality of large perforations 6. These perforations serve to allow water 10 to flow though the strainer apparatus 1 when shaken in the shaker bottle 9.

Referring to FIG. 1, each perforation 6 is covered by a fine mesh screen 7 that has been molded into the hemisphere 1, 2. In the preferred embodiment, the mesh screen 7 is a 200 mesh, stainless steel screen. This is preferred because this mesh screen 7 is sufficiently fine to contain the kava root 8 within the apparatus 1 and the stainless steel will not rust after continuous contact with water. While this is preferred, the mesh screen 7 material could be any material that has sufficiently fine pores to contain the kava root 8, and is made of a material that is safe for contact with food/beverages.

In the preferred embodiment the hemispheres 2, 3 of the strainer apparatus 1 are constructed of molded polycarbonate. This is preferred because the polycarbonate is cost effective, strong, and safe for contact with food/beverages. While this is preferred, the hemispheres 2, 3 could be constructed of a number of materials that can maintain their shape during use and are safe for contact with food/beverages, such as stainless steel.

In the preferred embodiment, the shape of the straining apparatus 1 is a round sphere. This is preferred because the shape allows for even distribution of compressive forces against the kava root 8 while the ball is shaken in a beverage medium 10. While this is preferred, the shape of the apparatus 1 could also be a geodesic structure closely resembling a sphere.

Figure 2:
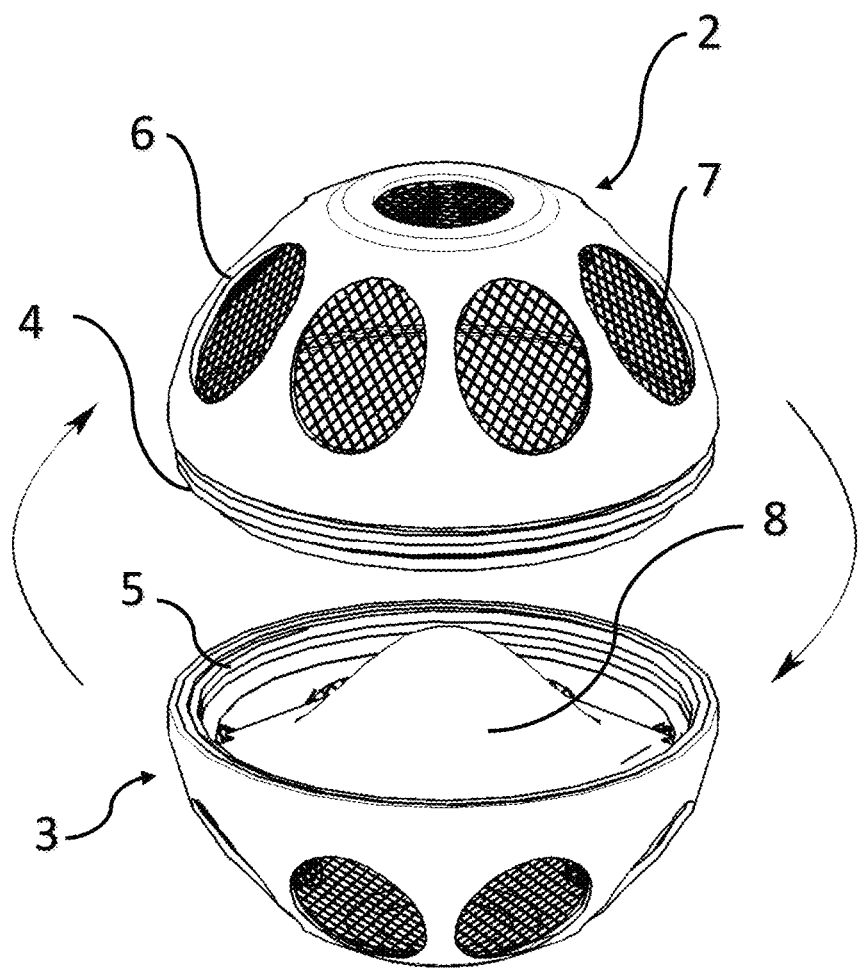
FIG. 2 is a detailed perspective view drawing depicting how to fill and seal the strainer apparatus with kava.
Figure 3:
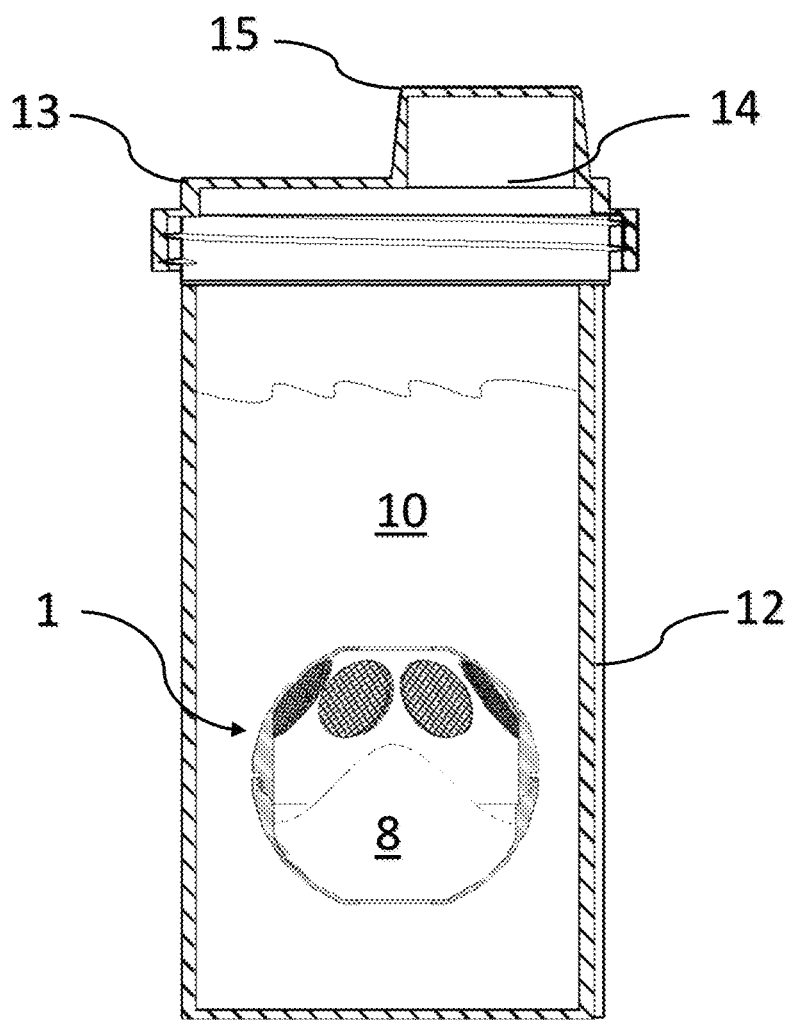
FIG. 3 is a detailed cross sectional drawing depicting and assembled and filled shaker bottle for brewing kava.

Referring to FIGS. 2 & 3, the preferred embodiment of the method of the present invention requires the following components: (1) a shaker bottle 9, (2) a strainer ball apparatus 1, (3) kava root 8, and (4) beverage medium 10.

Water is the preferred beverage medium 10 for extracting the kavalactones from the kava root 8, however, any number of beverage mediums 10 could be used to extract the kavalactones. Water was chosen as the preferred beverage medium 10 due to its low calorie count and it's readily availability. However, in the Pacific Ocean cultures of Polynesia, oftentimes milk, a solution of milk and water, or other fatty beverage mediums are used in place of water. The fat in these beverage mediums are capable of extracting the kavalactones from the kava root 8 more efficiently than water alone. However, the resulting tea will have a greater calorie and fat content and therefore is not considered the preferred beverage medium 10 for the method.

Referring to FIG. 2 the method of the present invention for brewing a kava beverage involves measuring the desired amount of kava root 8, dispensing it into one of the hemispheres 2, 3 of the straining apparatus 1, and then sealing closed the straining apparatus by twisting the two threaded connectors 4, 5. Secondly, the desired amount of beverage medium 10 is added to the shaker 9. Referring to FIG. 3, the filled straining apparatus is then submerged into the filled shaker and the shaker is sealed closed. The shaker is then agitated vigorously for a period of time, and then the liquid contents of the shaker is transferred into a drinking apparatus such as a cup for consumption.

In the preferred embodiment of the invention a beverage shaker 9 is used as a vessel hold and agitate the filled filter apparatus 1 and beverage medium 10. The typical beverage shaker 9 will be comprised of a cup-like structure 12 for holding the beverage medium 10 and straining apparatus 1, and a lid 13 for sealing the top of the cup-like structure. The lid 13 will also comprise a separate seal-able opening 14 and lid 15 that will allow the brewed kava beverage to be transferred from shaker 9, while still containing the strainer apparatus 1 to the beverage shaker 9. The beverage shaker 9 was chosen as the preferred vessel because it is simple to use and are readily available. However, any vessel which can hold the volume of the beverage medium 10 and strainer apparatus 1 and can be sealed and shaken vigorously can be used in its place.

In the preferred embodiment of the invention the strainer apparatus 1 used in the brewing method is the straining apparatus 1 of the present invention. This apparatus 1 is preferred because it is reusable, the therefore more eco-friendly, and because the additional weight of the reusable strainer apparatus 1 increases the compressive forces generated while shaking the shaker 9, therefore extracting more of the kavalactones from the root into the liquid. While this is preferred, the straining apparatus 1 could be replaced with a disposable, sealed filter bag filled with kava root 8, such as muslin, cheese cloth, or fine nylon bag. While this would not be as effective or eco-friendly, it does provide the advantage of being disposable and therefore eliminating the need for cleaning.

Figure 4:
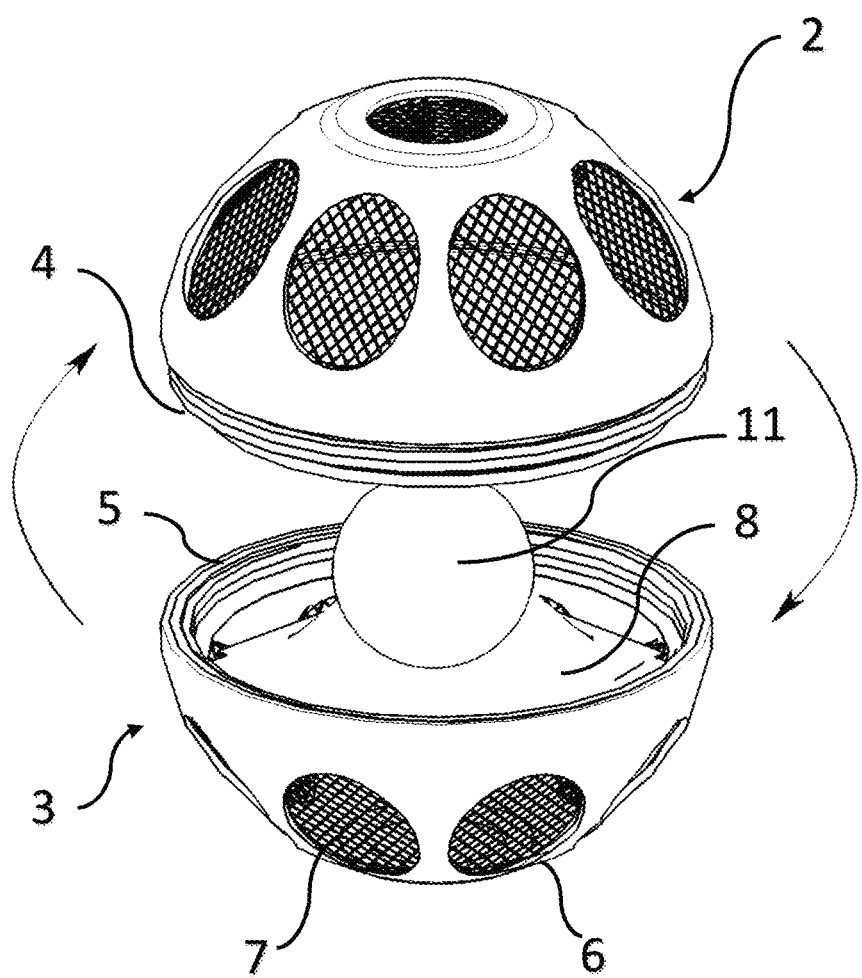
FIG. 4 is a detailed perspective view drawing of the alternate embodiment of the invention depicting how to fill and seal the strainer apparatus with kava and a spherical weighted object.

Referring to FIG. 4, in an alternate embodiment of the invention, at least one weighted, corrosion resistant, spherical object 11 is place inside of the strainer apparatus 1 in with the kava 9. In the preferred embodiment a stainless steel ball is used for the weighted object 11 due to its high density, corrosion resistance, and cost efficiency. This weighted sphere 11 could be replaced with a sphere of similar physical properties, such as ceramics or porcelain.

The weighted sphere(s) 11 serves to increases the pressure exerted on the kava 8 when the shaker 9 is agitated. When shaken, the weighted sphere(s) 11 will collide with the walls of the strainer apparatus 1 exerting significantly more force on the kava 8 trapped between the sphere 11 and wall of the strainer apparatus than would otherwise be exerted without the addition of the weighted sphere(s) 11. Exerting more force on the kava 8 will increase the efficiency of the brewing process, thereby reducing the amount of time required to agitate the shaker 9 or increasing the potency of the resulting kava beverage.

It would be appreciated by those skilled in the art that various changes and modifications can be made to the illustrated embodiments without departing from the spirit of the present invention. All such modifications and changes are intended to be covered by the appended claims.

What is claimed is:

1. A kava beverage brewing assembly for rapidly brewing kava beverage, said assembly comprising:
   a spherical structure capable of containing a supply of kava root, said structure being submersible in a liquid to effect brewing of said kava, structurally supported to withstand being vigorously shaken inside of a larger shaker device while submerged in a liquid, capable of being opened, closed, and sealed to allow addition and removal of kava, containing a plurality of perforations that are covered by a fine mesh screen capable of confining the kava inside the spherical structure;

a vessel for brewing the kava beverage which will contain the spherical structure and beverage medium; wherein the vessel defines the larger shaker device at least one weighted, corrosion resistant, spherical object which can be placed inside of the spherical structure along with the kava wherein while the spherical structure is vigorously shaken inside the larger shaker device, the spherical object increases pressure on the kava increasing the efficiency of the brewing process.

2. The kava beverage brewing assembly according to claim 1, wherein said spherical structure is comprised of two hemispheres constructed of corrosion resistant materials with mating threaded connections containing a plurality of larger perforations that are covered by a 200 mesh or finer, stainless steel mesh screen.

3. The kava beverage brewing assembly according to claim 2, wherein said means for brewing the kava beverage is a beverage shaker with removable top and secondary smaller lid which is capable of being filled with sufficient brewing medium and the spherical structure and shaken vigorously.

* * * * *